(12) United States Patent
Hsu (10) Patent No.: US 8,760,105 B2
(45) Date of Patent: Jun. 24, 2014

(54) ELECTRIC MACHINE AND CURRENT SOURCE INVERTER DRIVE SYSTEM

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 364 days.

(21) Appl. No.: 13/292,196

(22) Filed: Nov. 9, 2011

(65) Prior Publication Data

US 2012/0133320 A1    May 31, 2012

Related U.S. Application Data

(60) Provisional application No. 61/417,906, filed on Nov. 30, 2010.

(51) Int. Cl.
*H02P 1/26* (2006.01)
*H02K 19/12* (2006.01)
*H02K 11/00* (2006.01)
*H02K 19/10* (2006.01)
*H02K 3/20* (2006.01)
*H02M 1/00* (2006.01)

(52) U.S. Cl.
CPC .......... *H02K 11/0094* (2013.01); *H02K 19/103* (2013.01); *H02K 3/20* (2013.01); *H02K 19/12* (2013.01); *H02K 11/0073* (2013.01); *H02M 2001/0087* (2013.01); *H02M 2001/007* (2013.01)
USPC ............................. 318/767; 318/727; 318/800

(58) Field of Classification Search
USPC ......... 318/767, 727, 800, 801, 802, 803, 768, 318/818
See application file for complete search history.

(56) References Cited

U.S. PATENT DOCUMENTS

| | | | |
|---|---|---|---|
| 3,984,711 A * | 10/1976 | Kordik | 310/49.46 |
| 6,577,087 B2 | 6/2003 | Su | |
| 6,969,967 B2 | 11/2005 | Su | |
| 7,023,171 B2 | 4/2006 | Su et al. | |
| 7,129,611 B2 | 10/2006 | Hsu | |
| 7,134,180 B2 | 11/2006 | Hsu | |
| 7,191,605 B2 | 3/2007 | Hsu et al. | |
| 7,408,794 B2 | 8/2008 | Su | |
| 7,514,833 B2 | 4/2009 | Hsu et al. | |
| 7,518,278 B2 | 4/2009 | Hsu | |
| 7,719,153 B2 | 5/2010 | Hsu | |
| 8,264,191 B1 * | 9/2012 | Ranganathan et al. | 318/767 |
| 2009/0218895 A1 | 9/2009 | Hsu | |
| 2010/0123364 A1 | 5/2010 | Hsu | |
| 2011/0074326 A1 | 3/2011 | Su | |

* cited by examiner

*Primary Examiner* — Karen Masih
(74) *Attorney, Agent, or Firm* — Colin L. Cini (57) ABSTRACT

A drive system includes an electric machine and a current source inverter (CSI). This integration of an electric machine and an inverter uses the machine's field excitation coil for not only flux generation in the machine but also for the CSI inductor. This integration of the two technologies, namely the U machine motor and the CSI, opens a new chapter for the component function integration instead of the traditional integration by simply placing separate machine and inverter components in the same housing. Elimination of the CSI inductor adds to the CSI volumetric reduction of capacitors and the elimination of PMs for the motor further improve the drive system cost, weight, and volume.

6 Claims, 11 Drawing Sheets

FIG. 1
PRIOR ART

| Design Feature | Hybrid Camry | 2004 Prius |
|---|---|---|
| Boost convert power rating | 30 kW | 20 kW |
| Battery voltage | 244.8 V | 201.6 V |
| Filter capacitor (LV side) | 500 Vdc, 378 µF | 600 Vdc, 282 µF |
| Inductor | 212 µH at 1 kHz | 373 µH at 1 kHz |
| Small resistor (HV side) | 53.8 kΩ | 64.3 kΩ |
| Small capacitor (HV side) | 750 Vdc, 0.9 µF | 750 Vdc, 0.1 µF |
| Smoothing capacitor | 750 Vdc, 2,098 µF | 600 Vdc 1,130 µF |
| <u>Total capacitors</u> | 2,476 µF | 1,412 µF |

ELECTRIC MACHINE AND CURRENT SOURCE INVERTER DRIVE SYSTEM

CROSS REFERENCE TO RELATED APPLICATIONS

The present application claims priority to U.S. Provisional Patent Application Ser. No. 61/417,906 filed on 30 Nov. 2010, the contents being incorporated by reference herein as if included at length.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

The invention relates to electrical devices and more specifically to electrical motors and generators coupled with Current Source Inverters (CSI) for use in electric motors and generators.

2. Description of the Related Art

The cost of a drive system for electric vehicles is currently very high. It is over four times the cost target for a year 2020 drive system. Permanent Magnets (PM) are a major cost driver in an interior PM machine. The cost of these and other PM machines, such as PM wind power generators, megawatt PM motors, depend on the supply and demand, and thus the commodity cost, of rare earth PM materials.

Voltage Source Inverters (VSIs) require bulky, expensive and temperature-limited DC bus capacitors. As operational temperatures increase, the ability of film capacitors to handle ripple currents decreases, necessitating the addition of even more capacitance.

The current, annual global vehicle production is around 70 million units. With this growing number of vehicles on the road and the pressure from global warming and non-renewable oil shortage, the on-line electric vehicles will help meet the market demand. The market for wind power generators is also growing rapidly. The integration of a U machine (e.g., electric motor with an uncluttered rotor architecture) and CSI can cut the cost and improve performance of wind power generators. The spin-off companies from this new technology would undoubtedly produce a strong positive impact on the economy.

Related background teachings, attributed to the present inventor, include U.S. patent application Ser. No. 12/466,169 Substantially Parallel Flux Uncluttered Rotor Machines filed May 14, 2009; U.S. Pat. No. 7,719,153 Permanent Magnet Machine and Method with Reluctance Poles and Non-identical PM Poles for High Density Operation; U.S. Pat. No. 7,550,890 High slot utilization systems for electric machines; U.S. Pat. No. 7,514,833 Axial gap permanent-magnet machine with reluctance poles and PM element covers; U.S. Pat. No. 7,518,278 High strength undiffused brushless machine and method; U.S. Pat. No. 7,270,203 Electric machine for hybrid motor vehicle; U.S. Pat. No. 7,129,611 Method and radial gap machine for high strength undiffused brushless operation; U.S. Pat. No. 7,023,171 Integrated inverter for driving multiple electric machines; U.S. Pat. No. 6,993,924 Floating loop system for cooling integrated motors and inverters using hot liquid refrigerant; U.S. Pat. No. 6,989,619 Rotor apparatus for high strength undiffused brushless electric machine; US Patent Application 20090236924 Brushless Machine With Tapered Poles; US Patent Application 20090146511 Permanent-Magnet-Less Synchronous Reluctance System; and US Patent Application 20070075604 High Slot Utilization Systems for Electric Machines, each of which is incorporated by reference in this application as if included in their entirety.

A Current Source Inverter (CSI) can eliminate a large portion of the capacitors but requires additional inductors. What is needed is the integration of an electric machine and an inverter.

BRIEF SUMMARY OF THE INVENTION

A drive system includes an electric machine and a current source inverter (CSI). This integration of an electric machine and an inverter uses the electric machine's field excitation coil for not only flux generation in the electric machine but also for the CSI inductor. This integration of the two technologies, namely the U machine motor and the CSI, opens a new chapter for the component function integration instead of the traditional integration by simply placing separate machine and inverter components in the same housing. Elimination of the CSI inductor adds to the CSI volumetric reduction of capacitors and the elimination of PMs for the motor further reduce the drive system cost, weight, and volume.

BRIEF DESCRIPTION OF THE SEVERAL VIEWS OF THE DRAWINGS

A more complete understanding of the preferred embodiments will be more readily understood by reference to the following detailed description when considered in conjunction with the accompanying drawings.

DETAILED DESCRIPTION OF THE INVENTION

Here, the current source inverter CSI and subsequently the U machine are briefly described to provide a better understanding of the foundation of their integration. The new technologies that this disclosure teaches can then be easily understood by those skilled in the art.

Figure 1:
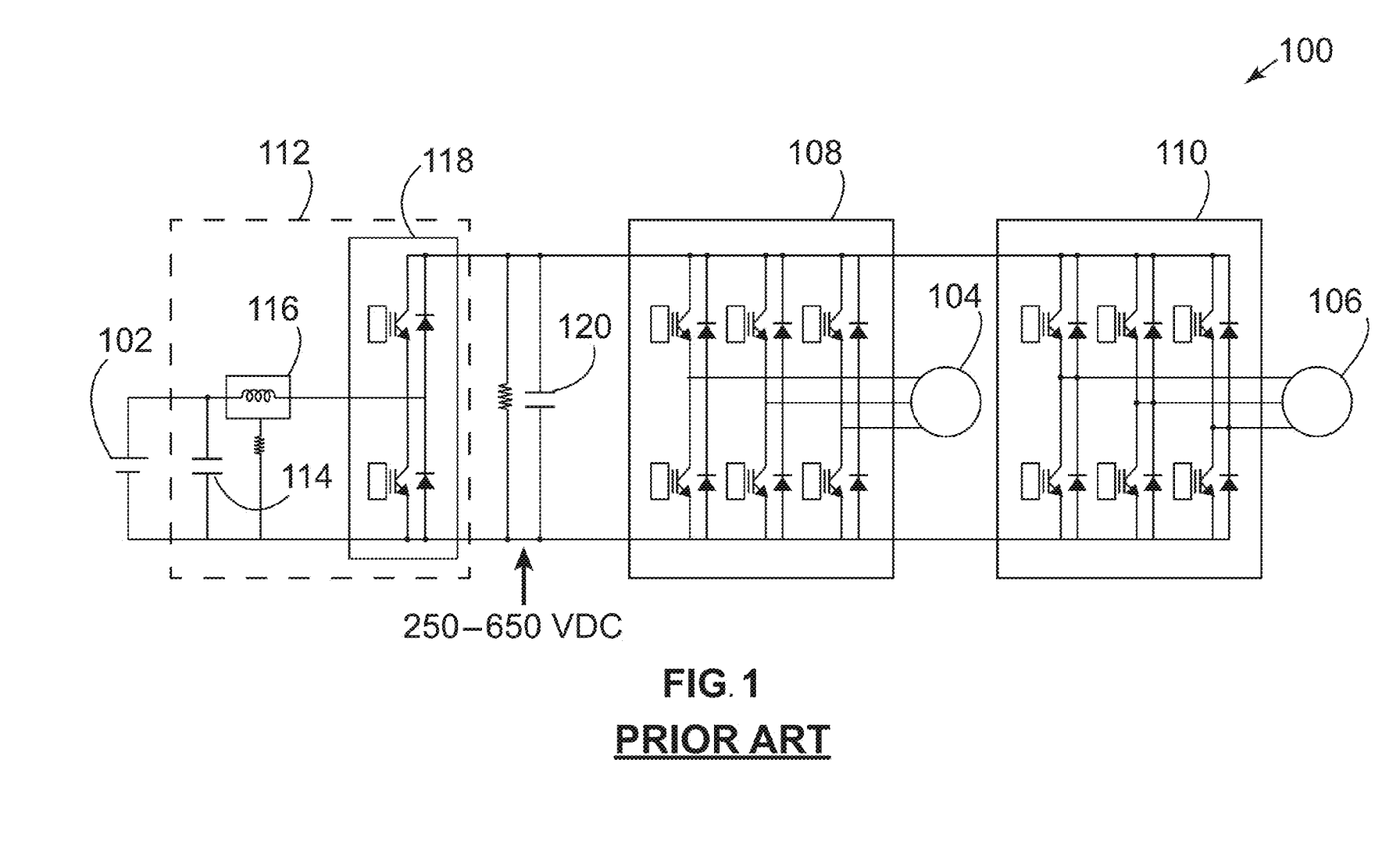
FIG. 1 illustrates a conventional, prior art voltage source inverter (VSI)

FIG. 1 shows the circuitry of a conventional, prior art voltage source inverter (VSI) 100 such as the one used on some of the Toyota brand hybrid automobile inverters. Here, a 250 volt battery 102, is connected to a motor 104/generator 106 via a motor inverter 108 and a generator inverter 110 respectively. A boost converter 112 includes a filter capacitor 114 on the low voltage side, an inductor 116, and an Integrated Power Module (IPM) 118. A smoothing capacitor 120 on the high voltage side is disposed between the boost converter 112 and the motor 104/generator 106.

Figure 2:
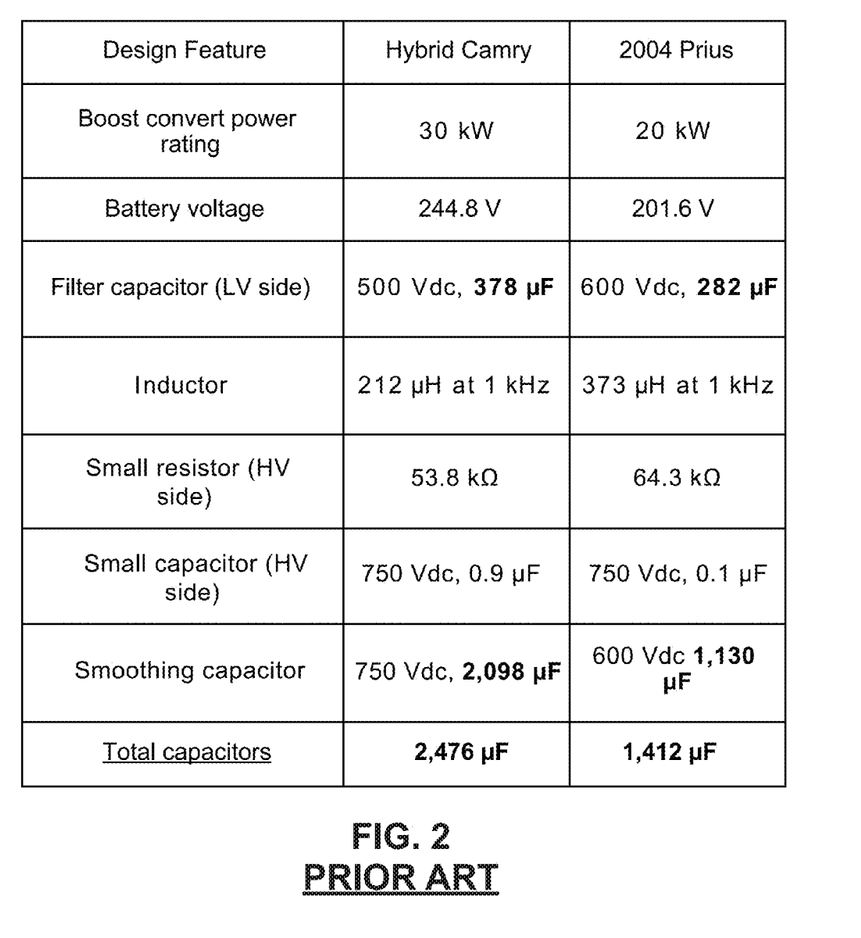
FIG. 2 illustrates a table comparing the required capacitors of the conventional, prior art VSI.

The requirement of large capacitors for the Voltage Source Inverters VSI is best illustrated with reference to the chart of FIG. 2, which compares two highly successful commercial products. For example, the Toyota brand Camry Hybrid model requires 2,476 µF of capacitors for 65 Deg C coolant and the 2004 Toyota brand Prius model requires 1,412 µF of capacitors at the same temperature.

Figure 3:
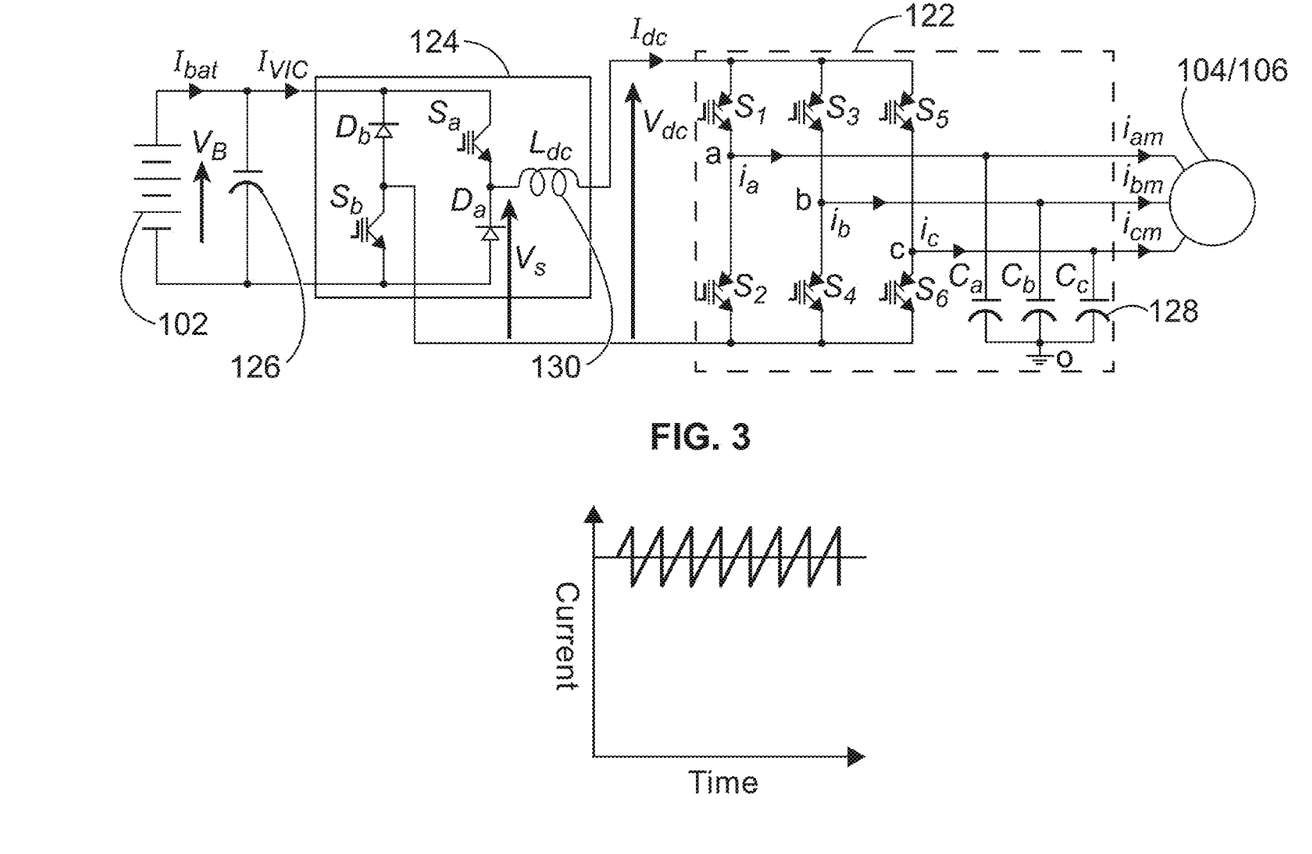
FIG. 3 illustrates a circuit diagram of the Current Source Inverter (CSI) of the present invention.

In the exemplary circuit illustrated in FIG. 3, an exemplary 50 kW Current Source Inverter CSI 122 that has the same power rating as the 2004 Toyota brand Prius model requires only 130 µF total capacitors. In this exemplary circuit, a battery 102 supplies a Voltage-Current Converter 124 and this, in turn, is connected to the Current Source Inverter 122. The Current Source Inverter 122 is, in turn, connected to the motor 104/generator 106. The capacitors, a 100 µF high frequency filter capacitor 126 and a 30 µF output filtering ac capacitor 128 are greatly substituted by the additional inductor such as the 300 µH energy storage inductor 130 as illustrated. Other examples may have additional inductors 130 sized between 100 µH and 500 µH.

The inductor 130 of a CSI carries mainly a DC current component and roughly a 10% of the total current for a high frequency current component. The current components are shown in the center chart below the circuit diagram of FIG. 3 and labeled Current vs. Time. The high frequency current component is for the commutation and voltage boosting functions. Instead of wasting the DC flux component in the inductor 130, the present example utilizes this DC flux to produce the needed field excitation for the electric machine, 104/106, for example.

Figure 4:
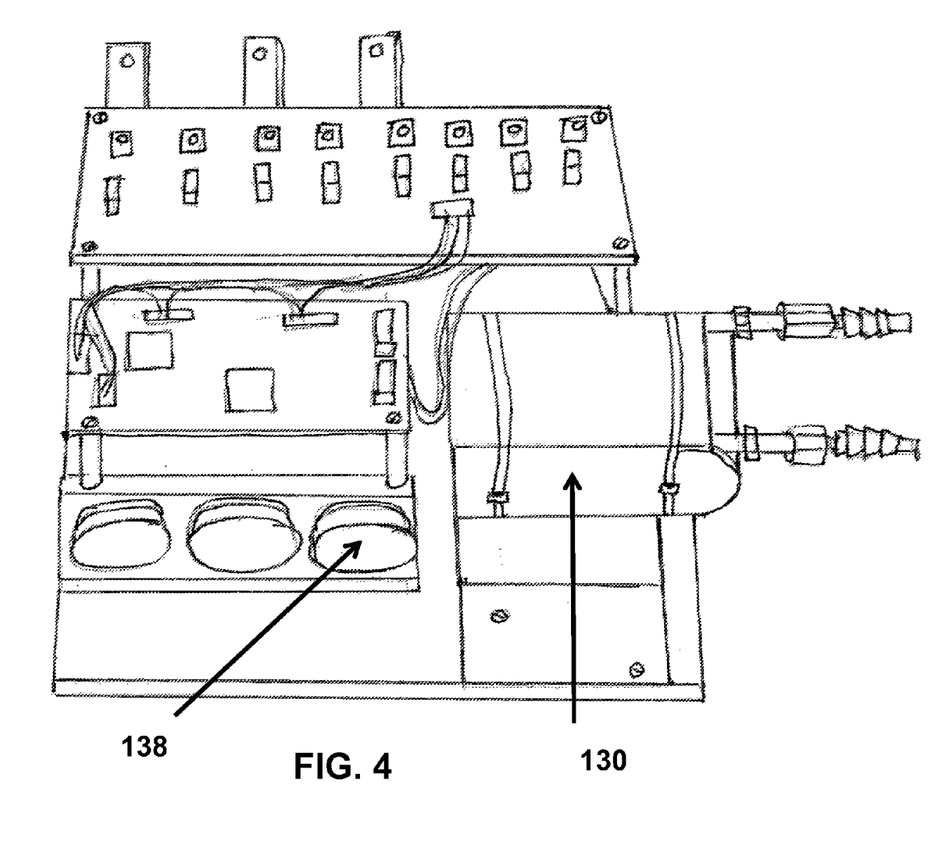
FIG. 4 illustrates a 50 kW CSI prototype.

FIG. 4 illustrates a prototype 50 kW CSI developed at Oak Ridge National Laboratory, National Transportation Research Center. Note the relatively small capacitors 128 and relatively large inductor 130 of a standalone CSI.

Figure 5:
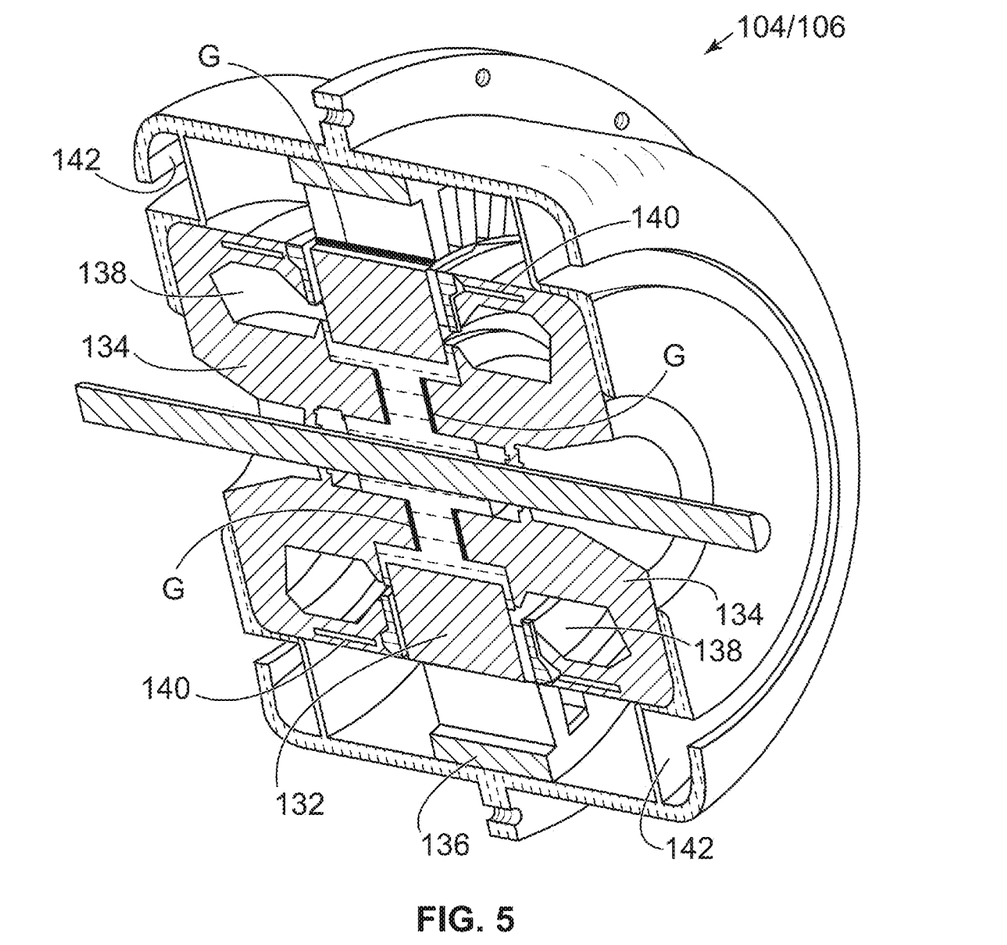
FIG. 5 illustrates a sectional view of the electric U machine.

Let us now look at the U motor as an example of electric machine 104/106 integration. FIG. 5 shows a sectional view of the U motor of the current example. The rotor 132 is riding on a set of bearings (not shown) that are mounted in the inner diameter of the stationary excitation cores 134. A radial air gap G is located between the machine's rotor 132 and stator core 136. The rotor 132 also has a set of axial air gaps G that face the stationary excitation cores 134 located at both axial ends of the machine 104/106. The stationary, donut-shape excitation coils 138, located inside the cavities of the excitation cores 134, produce the required flux. No Permanent Magnet (PM) is required for the U motor. For the DC excitation current, the excitation core 134 can be made of solid iron with an equalizing section (not shown) to minimize the saliency ripple loss. The stationary excitation cores 134 can be used as the stator frame of the electric machine 104/106. The U motor can be cooled by transmission oil and/or the water ethylene glycol (WEG) mix circulated through the oil coolant channels 140 and WEG coolant channel 142 respectively.

Figure 6:
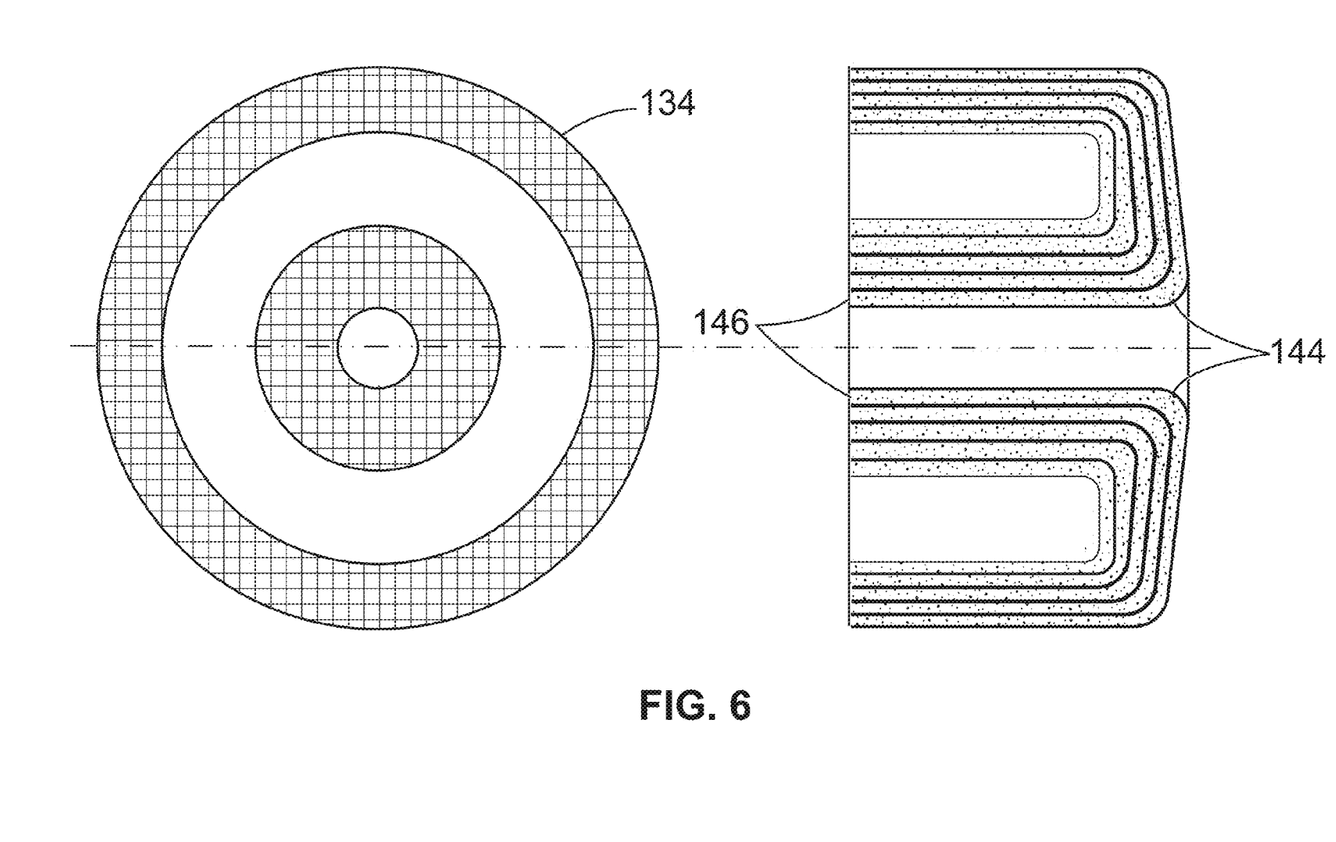
FIG. 6 illustrates details of the excitation core and showing insulated iron wires and insulated soft magnetic powders.

For the integrated U motor and CSI, the excitation core 134 can no longer use solid iron due to the high frequency current components. As an example, FIG. 6 shows a stationary excitation core 134 that is good for both DC and AC fluxes. The left side of the figure shows a side view and the left-hand side of the figure shows a front, sectional view. The core 134 requires new manufacturing technologies for combining the insulated iron wires 144 and soft magnetic powders 146 to be bonded and/or compressed together under high pressure to form a final excitation core 134 structure. This core 134 will provide low eddy current loss for both the DC and AC fluxes affected by the saliency effect or going along the leakage path and the main flux path.

Figure 7:
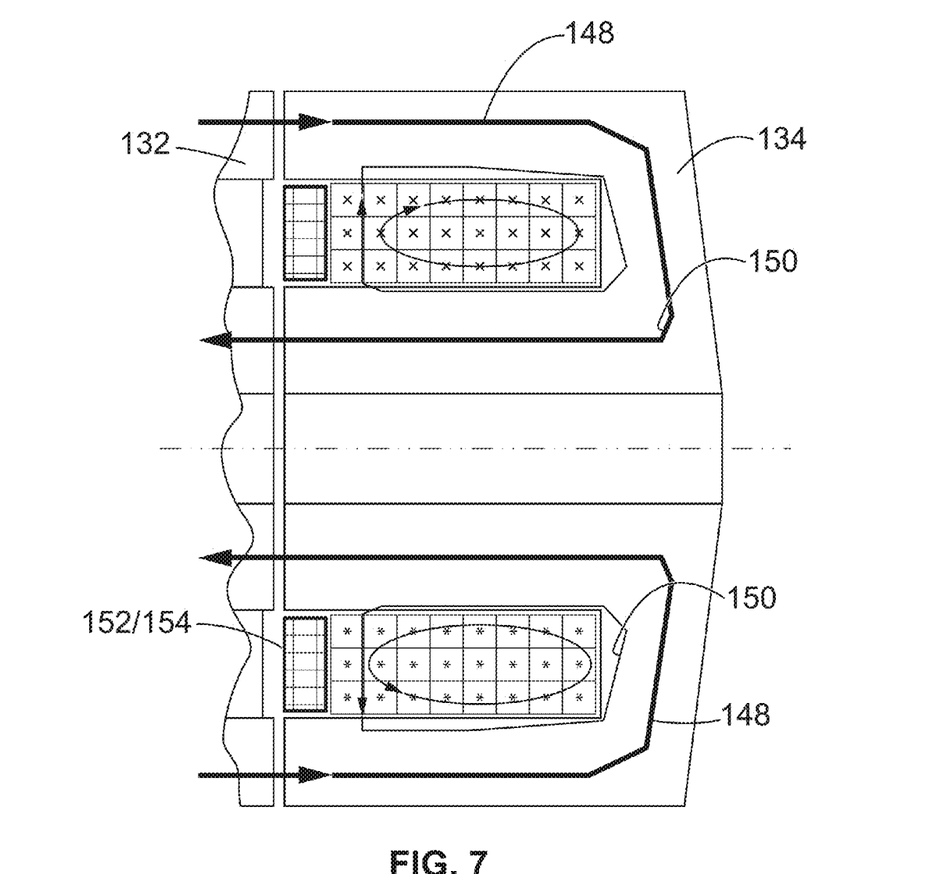
FIG. 7 illustrates the flux paths in the excitation core of FIG. 6.

FIG. 7 shows the flux paths in an excitation core 134. Flux path 148 is the main flux path in the core 134. It is a relatively longer and saturated magnetic path. Flux path 150 is the relatively shorter and mainly air leakage flux path. A high frequency blocking coil 152 and/or a controllable shunt wound coil 154 are also illustrated in FIG. 7.

Figure 8:
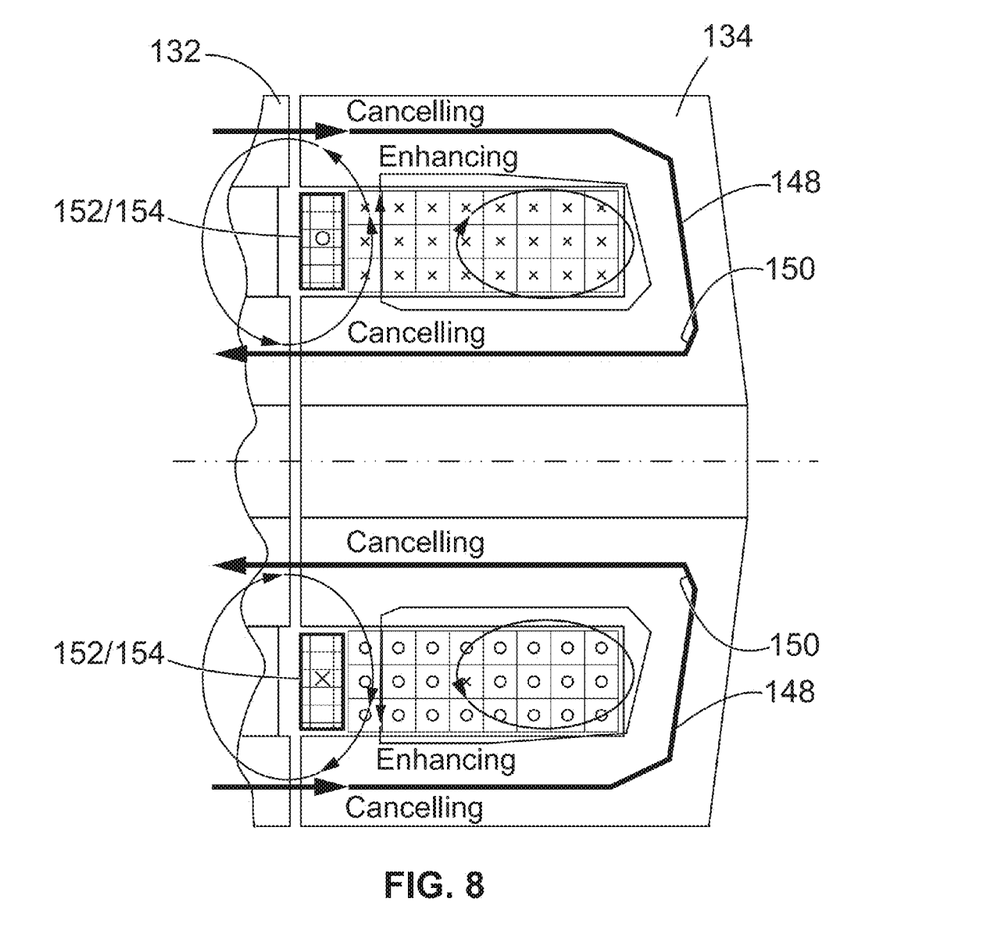
FIG. 8 illustrates the blocking of high frequency flux going through the rotor.

Referring now to FIG. 8, the flux paths 148/150 will now be described in even further detail. In order to eliminate the AC flux 148 going from the excitation core 134 into the rotor 132 and to retain the AC flux 148 in the leakage path inside the excitation core 134, the following approaches are utilized: high frequency blocking coil 152 or controllable shunt-wound coil 154 as shown in FIG. 8, would cancel the AC flux 148 that goes through this blocking coil 152. It enhances the AC flux 148 inside the leakage path 150 of the stationary excitation core 134. This is because the AC flux 148 going through this coil 152 will induce a back electromotive force (emf) and subsequently this emf would produce an AC short-circuit current in the coil 152. The phase angle of this short-circuit current is opposite to the phase angle of the AC current in the excitation coil 152. Hence, the AC flux 148 going into the rotor 132 is cancelled by the AC flux produced by the short-circuit coil 152 and enhances the leakage flux inside the excitation core 134. FIG. 8 illustrates the cancelling of the high frequency flux 148 going through the rotor 132 and the enhancement of the high frequency leakage flux 150.

Figure 9:
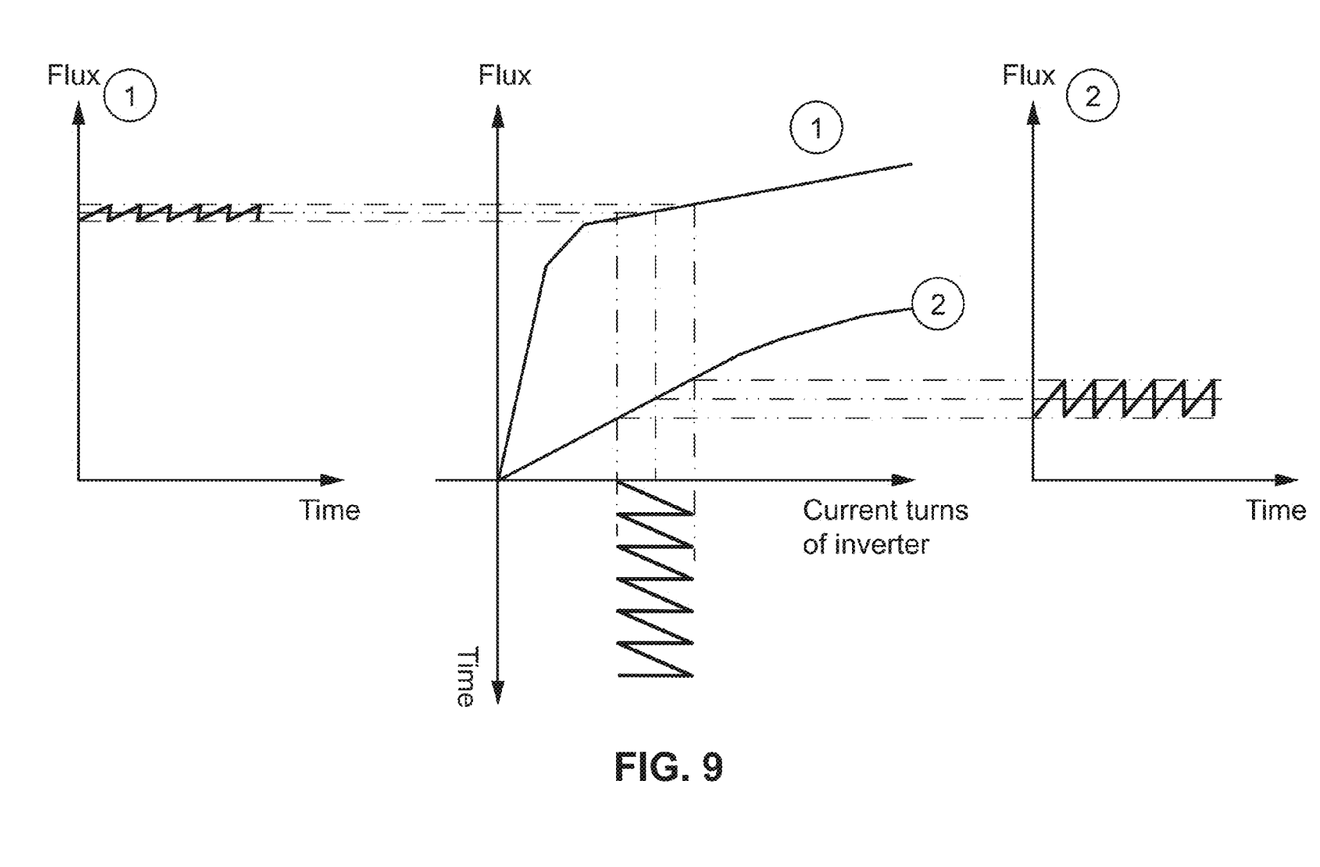
FIG. 9 illustrates a chart showing the magnetic saturation in the main flux path also suppresses high frequency flux going through the rotor.

FIG. 9 shows that the magnetic saturation in the relatively longer main flux path 148 also suppresses the high frequency flux 150 going through the rotor. Here, Flux (1) is the Long DC flux path 148 and (2) is the short leakage flux path 150. High frequency flux in the DC flux path is blocked by saturation, axial air gaps G, shielding coil 152 and controllable shunt coil 154.

Figure 10:
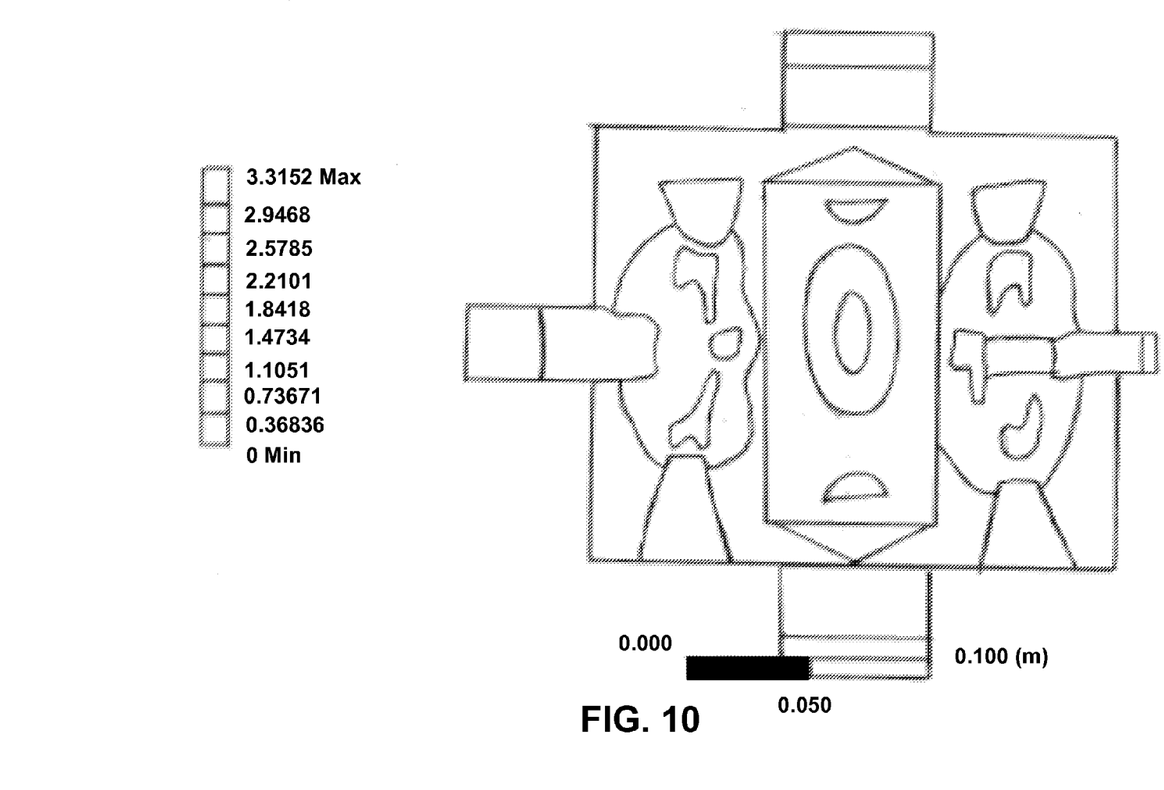
FIG. 10 illustrates a color drawing of a finite element flux plotting of the U machine.

The axial air gaps G in the U motor also play a role to push for more leakage flux inside the excitation core 134. FIG. 10 shows a finite element flux plotting of the exemplary U motor, the flux density in the rotor 132 is reduced from the excitation core due 134 to the axial air gaps G.

Figure 11:
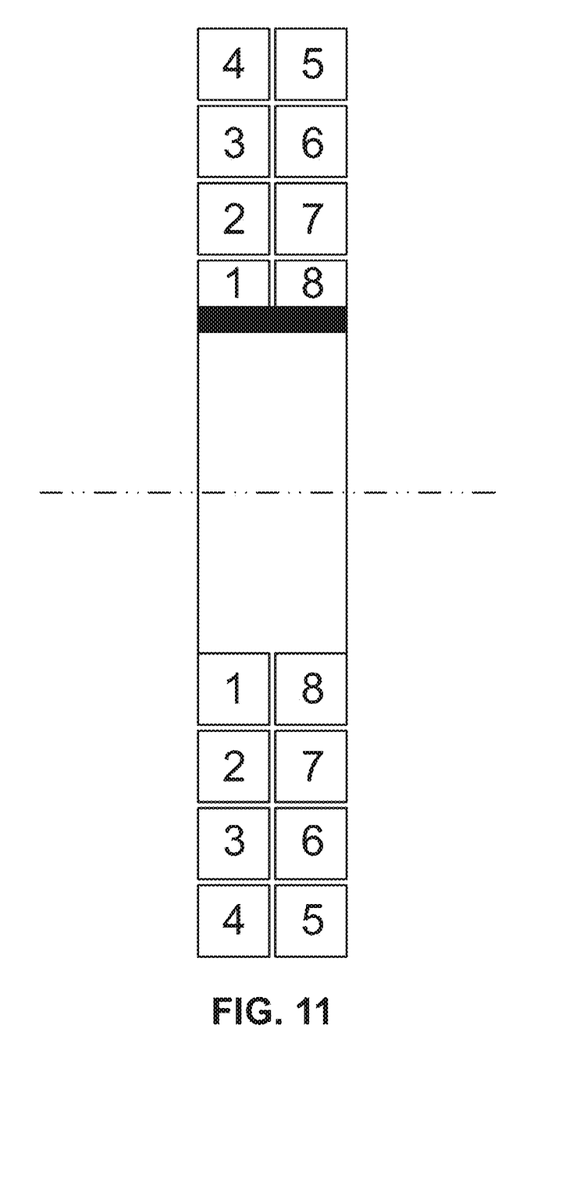
FIG. 11 illustrates a high-frequency flux blocking coil with an inner diameter short-circuit connection.

The high frequency blocking coil 152 is actually a short-circuit coil wound with Litzendraht wires. FIG. 11 shows a representation of a pan cake coil that makes the short-circuit connection, bolded in the figure, at the inner diameter (or the inner diameter of the coil) for occupying less space. The turn number of the coil is shown in the sample coil, it can be any number of turns.

While this disclosure describes and enables several examples of electric machines and current source inverters, other examples and applications are contemplated. Accordingly, the invention is intended to embrace those alternatives, modifications, equivalents, and variations as fall within the broad scope of the appended claims. The technology disclosed and claimed herein is available for licensing in specific fields of use by the assignee of record.

What is claimed is:

1. An electric machine and Current Source Inverter (CSI) drive system comprising:
   an permanent magnet-less electric motor;
   a current source inverter in electronic communication with said electric machine;

an energy storage inductor Ldc and said energy storage inductor is sized at between 100 μH and 500 μH; and wherein the electric machine's field excitation coil is used for both flux generation in the machine and for the inductor in the current source inverter.

2. The electric machine and drive system as recited in claim 1, wherein the energy storage inductor Ldc is sized at 300 μH.

3. The electric machine and drive system as recited in claim 1 and further comprising:

A 100 μF high frequency filter capacitor and a 30 μF output filtering ac capacitor.

4. The electric machine and drive system as recited in claim 1 and further comprising:

a stationary excitation core in said electric machine that carries both DC and AC fluxes, said core having insulated iron wires and soft magnetic powders bonded or compressed together to form said core.

5. The electric machine and drive system as recited in claim 1 and further comprising:

a high frequency blocking coil in said electric machine for eliminating the AC flux going from the excitation core into the rotor of the electric machine and retaining the AC flux in the leakage path inside the excitation core.

6. The electric machine and drive system as recited in claim 5 wherein the AC flux going through the high frequency blocking coil induces a back electromotive force and a short circuit current in the coil, and the phase angle of this short circuit current is opposite to the phase angle of the AC current in the excitation coil, such that the AC flux going into the rotor is cancelled by the AC flux produced by the short circuit coil and enhances the leakage flux inside the excitation core.

* * * * *